US012683787B2

(12) United States Patent
Manelius

(10) Patent No.: US 12,683,787 B2
(45) Date of Patent: Jul. 14, 2026

(54) METHOD AND SYSTEM OF ASSESSING, REMEDIATING, AND MAINTAINING NON-FUNGIBLE TOKENS (NFTS)

(71) Applicant: ATOMIC FORM, INC., Edmond, OK (US)

(72) Inventor: Rick Manelius, Edmond, OK (US)

(73) Assignee: Atomic Form, Inc., New York, NY (US)

( * ) Notice: Subject to any disclaimer, the term of this patent is extended or adjusted under 35 U.S.C. 154(b) by 20 days.

(21) Appl. No.: 18/660,076

(22) Filed: May 9, 2024

(65) Prior Publication Data

US 2024/0380596 A1     Nov. 14, 2024

Related U.S. Application Data

(60) Provisional application No. 63/501,011, filed on May 9, 2023.

(51) Int. Cl.
H04L 9/32        (2006.01)

(52) U.S. Cl.
CPC ................................ H04L 9/3213 (2013.01)

(58) Field of Classification Search
None
See application file for complete search history.

(56) References Cited

U.S. PATENT DOCUMENTS

| | | | |
|---|---|---|---|
| 12,244,703 B2 * | 3/2025 | Thompson | ............ H04L 9/0861 |
| 2020/0160289 A1 * | 5/2020 | Mahajan | ................ G06Q 20/02 |

| | | | |
|---|---|---|---|
| 2020/0273048 A1 * | 8/2020 | Andon | .................... G06Q 10/02 |
| 2022/0311611 A1 * | 9/2022 | Gaur | ...................... H04L 9/3213 |
| 2022/0391887 A1 * | 12/2022 | Jakobsson | ............. H04L 9/3239 |
| 2023/0006976 A1 * | 1/2023 | Jakobsson | ............... H04L 63/10 |
| 2023/0043223 A1 * | 2/2023 | Jakobsson | .............. G06F 21/44 |

(Continued)

OTHER PUBLICATIONS

Preda et al., "Exploring NFT Validation through Digital Watermarking", 2023, ARES '23 Proceedings of the 18th International Conference on Availability, Reliability, and Security, pp. 1-6. (Year: 2023).*

(Continued)

*Primary Examiner* — Kaveh Abrishamkar
(74) *Attorney, Agent, or Firm* — Kameron W. Kramer

(57)         ABSTRACT

Various techniques are described herein for rating, remediating, and maintaining non-fungible tokens ("NFTs"). NFTs can consist of data that's stored onchain and off chain, which affects the dozens of characteristics (e.g., integrity, longevity, upgradability, etc.) of the assets they holistic assets they represent. Data identifying the current and historical states of these characteristics can be obtained, processed, scored, stored, and served via public and private application programming interfaces ("APIs"). These ratings can be broken down into individual line items or calculated to achieve an overall risk score. Additionally, data outlining the deficiencies as well as multiple options or strategies to remediate these deficiencies can be surfaced to end-users and decentralized applications ("dapps"). Furthermore, these techniques can be publicly or privately asserted and certified to meet contractual or legal requirements of buyers unwilling or unable to interact with NFTs that do not (or cannot) cross particular scoring thresholds.

27 Claims, 3 Drawing Sheets

(56)                    References Cited

U.S. PATENT DOCUMENTS

2023/0179422 A1*  6/2023  Young ..................... G06F 16/27
                                                    726/5
2024/0283639 A1*  8/2024  Thompson ............ H04L 9/3239

OTHER PUBLICATIONS

Das et al., "Understanding Security Issues in the NFT Ecosystem",
Nov. 2022, pp. 667-681. (Year: 2022).*

* cited by examiner

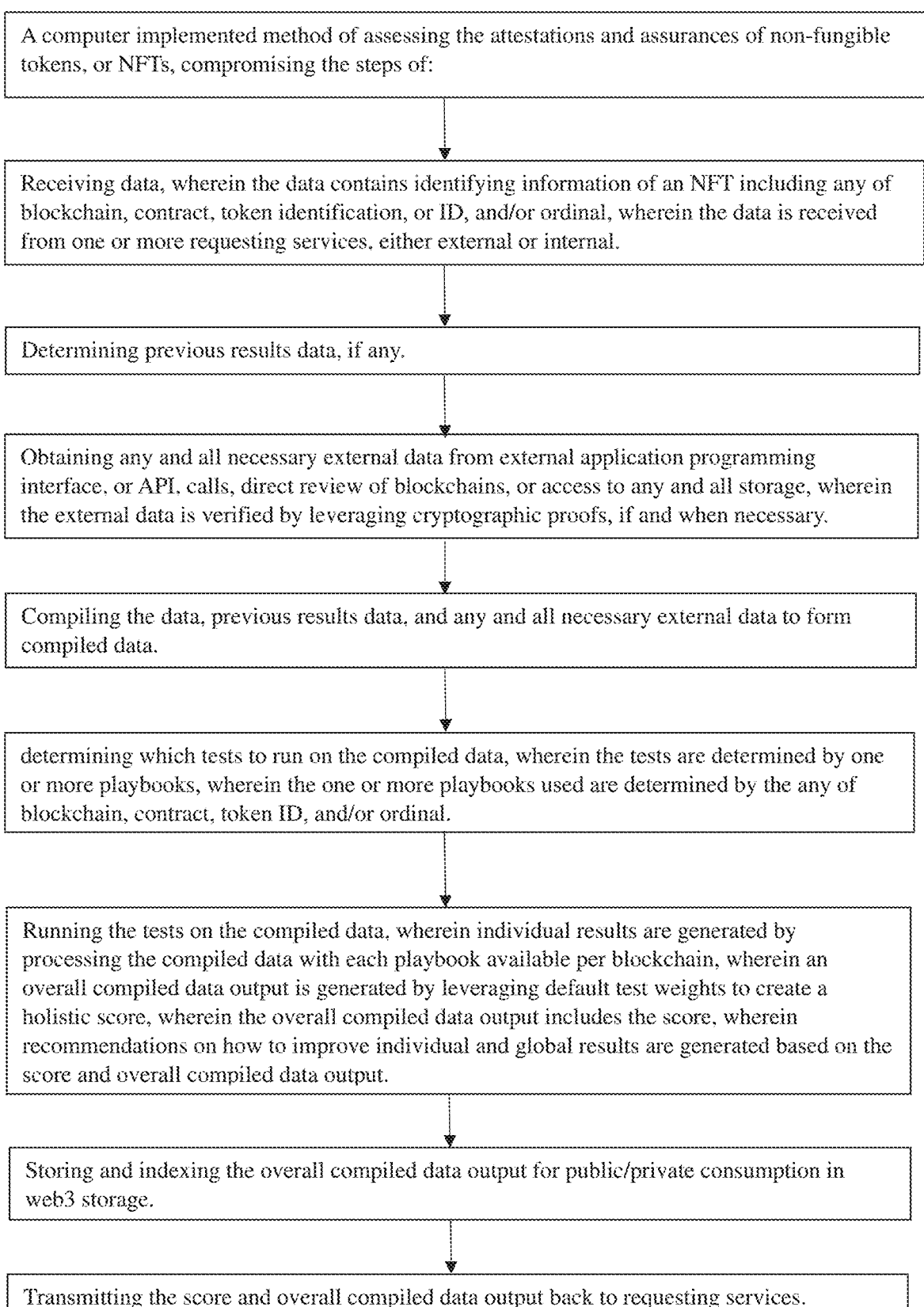

A computer implemented method of assessing the attestations and assurances of non-fungible tokens, or NFTs, compromising the steps of:

Receiving data, wherein the data contains identifying information of an NFT including any of blockchain, contract, token identification, or ID, and/or ordinal, wherein the data is received from one or more requesting services, either external or internal.

Determining previous results data, if any.

Obtaining any and all necessary external data from external application programming interface, or API, calls, direct review of blockchains, or access to any and all storage, wherein the external data is verified by leveraging cryptographic proofs, if and when necessary.

Compiling the data, previous results data, and any and all necessary external data to form compiled data.

determining which tests to run on the compiled data, wherein the tests are determined by one or more playbooks, wherein the one or more playbooks used are determined by the any of blockchain, contract, token ID, and/or ordinal.

Running the tests on the compiled data, wherein individual results are generated by processing the compiled data with each playbook available per blockchain, wherein an overall compiled data output is generated by leveraging default test weights to create a holistic score, wherein the overall compiled data output includes the score, wherein recommendations on how to improve individual and global results are generated based on the score and overall compiled data output.

Storing and indexing the overall compiled data output for public/private consumption in web3 storage.

Transmitting the score and overall compiled data output back to requesting services.

FIG. 1

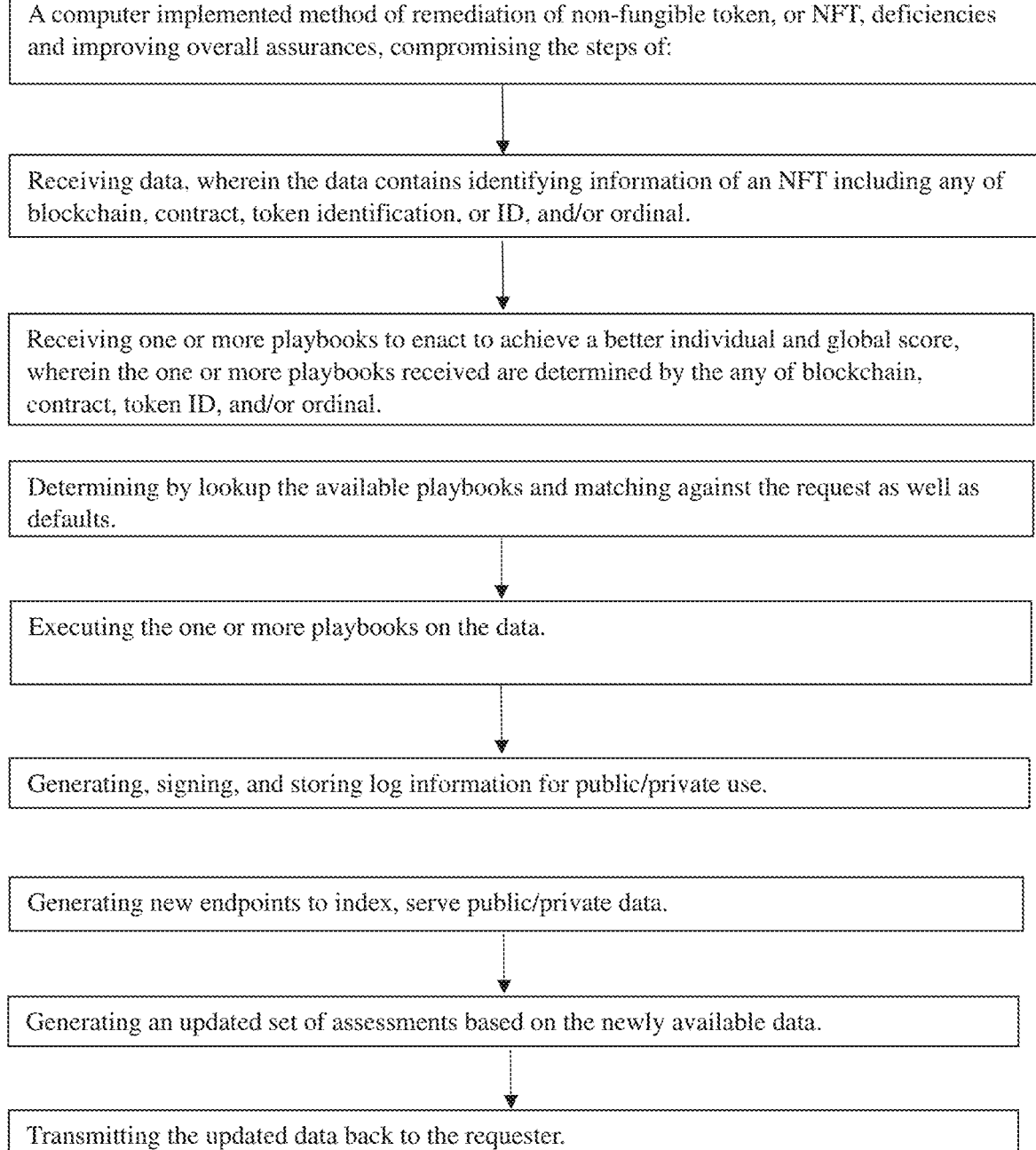

A computer implemented method of remediation of non-fungible token, or NFT, deficiencies and improving overall assurances, compromising the steps of:

Receiving data, wherein the data contains identifying information of an NFT including any of blockchain, contract, token identification, or ID, and/or ordinal.

Receiving one or more playbooks to enact to achieve a better individual and global score, wherein the one or more playbooks received are determined by the any of blockchain, contract, token ID, and/or ordinal.

Determining by lookup the available playbooks and matching against the request as well as defaults.

Executing the one or more playbooks on the data.

Generating, signing, and storing log information for public/private use.

Generating new endpoints to index, serve public/private data.

Generating an updated set of assessments based on the newly available data.

Transmitting the updated data back to the requester.

FIG. 2

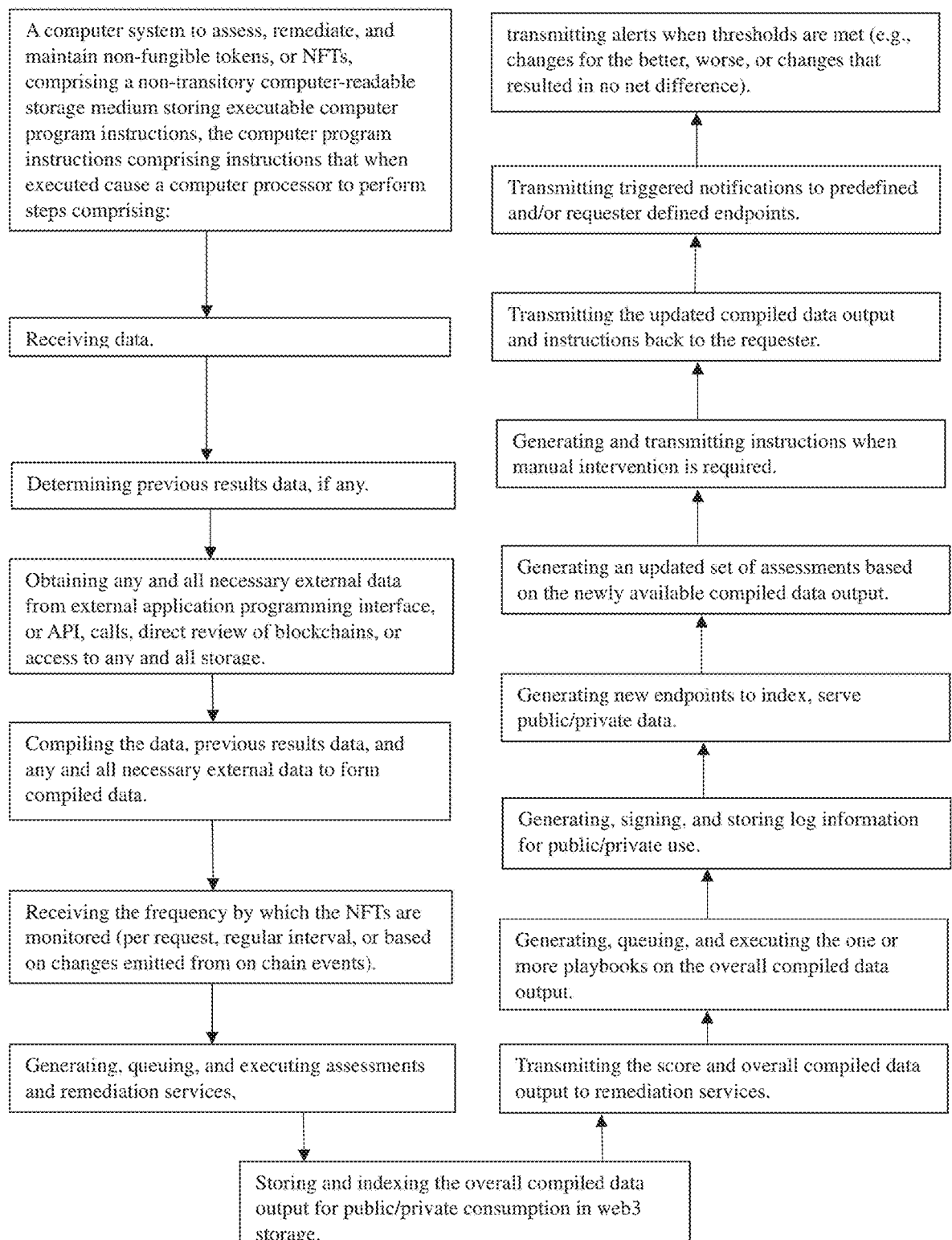

A computer system to assess, remediate, and maintain non-fungible tokens, or NFTs, comprising a non-transitory computer-readable storage medium storing executable computer program instructions, the computer program instructions comprising instructions that when executed cause a computer processor to perform steps comprising:

Receiving data.

Determining previous results data, if any.

Obtaining any and all necessary external data from external application programming interface, or API, calls, direct review of blockchains, or access to any and all storage.

Compiling the data, previous results data, and any and all necessary external data to form compiled data.

Receiving the frequency by which the NFTs are monitored (per request, regular interval, or based on changes emitted from on chain events).

Generating, queuing, and executing assessments and remediation services.

Storing and indexing the overall compiled data output for public/private consumption in web3 storage.

transmitting alerts when thresholds are met (e.g., changes for the better, worse, or changes that resulted in no net difference).

Transmitting triggered notifications to predefined and/or requester defined endpoints.

Transmitting the updated compiled data output and instructions back to the requester.

Generating and transmitting instructions when manual intervention is required.

Generating an updated set of assessments based on the newly available compiled data output.

Generating new endpoints to index, serve public/private data.

Generating, signing, and storing log information for public/private use.

Generating, queuing, and executing the one or more playbooks on the overall compiled data output.

Transmitting the score and overall compiled data output to remediation services.

FIG. 3

METHOD AND SYSTEM OF ASSESSING, REMEDIATING, AND MAINTAINING NON-FUNGIBLE TOKENS (NFTS)

CROSS-REFERENCE TO RELATED APPLICATIONS

This application claims the benefit of U.S. Provisional Patent Application Ser. No. 63/501,011 filed May 9, 2023, titled "METHOD AND SYSTEM OF ASSESSING, REME-DIATING, AND MAINTAINING NON-FUNGIBLE TOKENS (NFTS)," and the subject matter thereof is incorporated herein by reference thereto.

TECHNICAL FIELD

The present disclosure relates to non-fungible tokens (NFTs), and more specifically, to the assessing and remediation of NFTs.

PRIOR ART

Non-fungible tokens (NFTs) represent a new, blockchain native primitive where digital property rights can be asserted. As NFTs are being treated as property being bought, used, consumed, traded, and sold, problems arise. Owners may incorrectly believe they have sole control over an asset, while other NFTs may have deficiencies or attack vectors that allow them to degrade, be stolen, and/or become inaccessible for a variety of reasons.

There exists a need for assessing and then providing remediation of NFTs that would allow sellers, buyers, centralized applications ("apps"), or decentralized applications ("dapps") to confirm the integrity of an NFT and remediate any known issues. The word dapps as it is used herein may refer to any of apps, dapps, oracles, RPCs, smart contracts, etc.

With NFTs being sold more and more for larger and larger amounts of money, and for new use cases, it is increasingly vital that there are fundamental assertions that need to be in place to ensure that: (1) by default these rights are strong and unbreakable; (2) if there are risks, they are surfaced to end-users and dapps, and (3) if there are risks, any ways to reduce or remediate these can be made available.

The present invention recognizes that #1 is not always possible or adhered to, which necessitates the need to rate (#2) and remediate (#3) NFTs to ensure economies and activity built upon these new property primitives exist.

SUMMARY OF THE INVENTION

The present disclosure provides various techniques for rating, remediating, and maintaining NFTs. NFTs can consist of data that is stored onchain and offchain. NFTs are typically a type of blockchain based smart contract that consists of onchain ledger entries that reference data (metadata and media), which can be referenced and stored on and offchain. This can affect dozens of characteristics (e.g., integrity, longevity, upgradability, etc.) of the assets they holistically represent. Data identifying the current and historical states of these characteristics can be obtained, processed, scored, stored, and served via public and private application programming interfaces (APIs). These ratings can be broken down into individual line items or calculated to achieve an overall risk score. Additionally, data outlining the deficiencies as well as multiple options or strategies to remediate these deficiencies can be surfaced to end-users, dapps, and apps. Furthermore, these techniques can be publicly or privately asserted and certified to meet contractual or legal requirements of sellers, buyers, apps, or dapps unwilling or unable to interact with NFTs that do not (or cannot) cross particular scoring thresholds.

The present invention provides a computer implemented method of assessing the attestations and assurances of non-fungible tokens, or NFTs, compromising: receiving data, wherein the data contains identifying information of an NFT including any of blockchain, contract, token identification, or ID, and/or ordinal, wherein the data is received from one or more requesting services, either external or internal; determining previous results data, if any; obtaining any and all necessary external data from external application programming interface, or API, calls, direct review of blockchains, or access to any and all storage locations, wherein the external data is verified by leveraging cryptographic proofs, if and when necessary; compiling the data, previous results data, and any and all necessary external data to form compiled data; determining which tests to run on the compiled data, wherein the tests are determined by one or more playbooks, wherein the one or more playbooks used are determined by the any of blockchain, contract, token ID, and/or ordinal; running the tests on the compiled data, wherein individual results are generated by processing the compiled data with each playbook available per blockchain, wherein an overall compiled data output is generated by leveraging default test weights to create a holistic score, wherein the overall compiled data output includes the score, wherein recommendations on how to improve individual and global results are generated based on the score and overall compiled data output; storing and indexing the overall compiled data output for public/private consumption in web3 storage; and transmitting the score and overall compiled data output back to requesting services.

The method of the present invention further comprises any of the following with respect to the assessing the assurances of NFTs, in any combination: wherein the assessment requests occur at the time of NFT interaction with user's wallet or dapp/smart contract to provide warnings and other safeguards; wherein the request occurs from 3rd party apps/dapps needing real-time verifications to assert the claims on an asset; wherein the request/result is used by oracle services; wherein the requester submits their own weighting mechanisms; wherein the requester submits their own logic or playbooks, wherein external verification badges can be generated and displayed on 3rd party locations and show current results along with links to see list of evidence with historical records; and/or wherein signed attestations and evidence (with cryptographic signatures or proofs) is provided as assertions.

The present invention further provides a computer implemented method of remediation of non-fungible token, or NFT, deficiencies and improving overall assurances, comprising: receiving data, wherein the data contains identifying information of an NFT including any of blockchain, contract, token identification, or ID, and/or ordinal; receiving one or more playbooks to enact to achieve a better individual and global score, wherein the one or more playbooks received are determined by the any of blockchain, contract, token ID, and/or ordinal; determining by lookup the available playbooks and matching against the request as well as defaults; executing the one or more playbooks on the data; generating, signing, and storing log information for public/private use; generating new endpoints to index, serve public/private data; generating an updated set of assessments based on the newly available data; transmitting the updated data back to the requester; and transmitting triggered notifications to predefined and/or requester defined endpoints.

The method of the present invention further comprises any of the following with respect to the remediating of NFT deficiencies and improving of overall assurances, in any combination: wherein remediation potential occurs at the time of NFT interaction, transmission, purchase, or sale; wherein off chain remediation information is served from a known, verified index and leverageable by apps/dapps; wherein the request provides their own keys, credentials, and access points for remediation storage and other factors vs reliance on default facilities; wherein bulk actions are taken over entire collections or a plurality of collections; wherein a minimum achievable score is desired over a perspective set of tasks to run; wherein a determination is made based on the target goal and the case by which the system can implement; wherein changes require manual intervention on behalf of the requester to authorize, sign, or otherwise interact with or without the method to achieve the desired remediation; wherein the requester can submit custom data and playbooks; wherein cryptographic evidence is provided along with signed attestations and assurances that the process was run; and/or wherein oracles are notified.

The present invention further provides a computer system to assess, remediate, and maintain non-fungible tokens, or NFTs, comprising: a non-transitory computer-readable storage medium storing executable computer program instructions, the computer program instructions comprising instructions that when executed cause a computer processor to perform steps comprising: receiving data, wherein the data contains identifying information of an NFT including any of blockchain, contract, token identification, or ID, and/or ordinal, wherein the data is received from one or more requesting services (external or internal); determining previous results data, if any; obtaining any and all necessary external data from external application programming interfaces, or APIs, calls, direct review of blockchains, or access to any and all storage, wherein the external data is verified by leveraging cryptographic proofs, if and when necessary; compiling the data, previous results data, and any and all necessary external data to form compiled data; receiving the frequency by which the NFTs are monitored (per request, regular interval, or based on changes emitted from on chain events); generating, queuing, and executing assessments and remediation services, wherein assessing the compiled data is achieved by running tests on the compiled data is determined by one or more playbooks, wherein the one or more playbooks used are determined by the any of blockchain, contract, token ID, and/or ordinal, wherein an overall compiled data output is generated by leveraging default test weights to create a holistic score, wherein the overall compiled data output includes the score, wherein recommendations on how to improve individual and global results are generated based on the score and overall compiled data output; storing and indexing the overall compiled data output for public/private consumption in web3 storage; transmitting the score and overall compiled data output to remediation services, wherein the remediation services receive the one or more playbooks to enact to achieve a better individual and global score; generating, queuing, and executing the one or more playbooks on the overall compiled data output; generating, signing, and storing log information for public/private use; generating new endpoints to index, serve public/private data; generating an updated set of assessments based on the newly available compiled data output; generating and transmitting instructions when manual intervention is required; transmitting the updated compiled data output and instructions back to the requester; transmitting triggered notifications to predefined and/or requester defined endpoints; and transmitting alerts when thresholds are met (e.g., changes for the better, worse, or changes that resulted in no net difference).

The method of the present invention further comprises any of the following with respect to the system of assessing, remediating, and maintaining NFTs, in any combination: wherein a decrease or alteration in an individual or global score triggers an automatic operation (when possible) to remediate and maintain a given score; wherein a dip in an individual or global score triggers an alert to predefined parties and systems to enact necessary, manual interventions; wherein a reduction in score is permanent and unfixable, and any necessary changes as a result of that change should be employed; wherein certified attestations of the score before and after a given blockheight or UTC timestamp or created and attested to with cryptographic signatures and stored in a public/private registry; wherein a duration of monitoring and maintenance of a score is set to meet contractual and legal requirements; wherein a loss of all known media and metadata seeds is initiated by retrieval and deployment from offline or archival storage; and/or wherein users can access entire previous snapshots of an NFT's data and media.

In the above embodiments, previous results data includes timestamps and playbooks associated therewith.

None of the prior art fully addresses the problems resolved by the present invention. The present invention overcomes these limitations contained in the prior art.

Certain embodiments of the invention have other steps or elements in addition to or in place of those mentioned above. The steps or element will become apparent to those skilled in the art from a reading of the following detailed description when taken with reference to the accompanying figures, if any.

BRIEF DESCRIPTION OF THE DRAWINGS

FIG. 1 illustrates a block diagram showing the computer implemented method of assessing the attestations and assurances of non-fungible tokens (NFTs) of the present invention.

FIG. 2 illustrates a block diagram showing the computer implemented method of remediation of non-fungible tokens (NFTs) of the present invention.

FIG. 3 illustrates a simplified block diagram showing the computer implemented method to assess, remediate, and maintain non-fungible tokens (NFTs) of the present invention.

DETAILED DESCRIPTION OF THE INVENTION

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail.

The method and system of the present invention may be implemented using a single computer, or a network of computers, including cloud-based computer implementations. The operations of the present invention, specifically, the ability to assess, remediate, and maintain NFTs, can be done through either hardware or through computer programs installed on non-transitory computer storage and executed by the processors to perform the functions described herein. The present invention comprises any number of appropriate management systems for data access and retrieval in order to perform the functions. The present invention includes other hardware and/or software elements necessary for the operations as provided herein.

FIG. 1 illustrates a block diagram showing the computer implemented method of assessing the attestations and assurances of non-fungible tokens (NFTs) of the present invention. Each block is a step in the method. The steps consist of the following: receiving data, wherein the data contains identifying information of an NFT including any of blockchain, contract, token identification, or ID, and/or ordinal, wherein the data is received from one or more requesting services, either external or internal; determining previous results data, if any; obtaining any and all necessary external data from external application programming interface, or API, calls, direct review of blockchains, or access to any and all storage locations, wherein the external data is verified by leveraging cryptographic proofs, if and when necessary; compiling the data, previous results data, and any and all necessary external data to form compiled data; determining which tests to run on the compiled data, wherein the tests are determined by one or more playbooks, wherein the one or more playbooks used are determined by the any of blockchain, contract, token ID, and/or ordinal; running the tests on the compiled data, wherein individual results are generated by processing the compiled data with each playbook available per blockchain, wherein an overall compiled data output is generated by leveraging default test weights to create a holistic score, wherein the overall compiled data output includes the score, wherein recommendations on how to improve individual and global results are generated based on the score and overall compiled data output; storing and indexing the overall compiled data output for public/private consumption in web3 storage; and transmitting the score and overall compiled data output back to requesting services.

FIG. 2 illustrates a block diagram showing the computer implemented method of remediation of non-fungible tokens (NFTs) of the present invention. The steps consist of the following: receiving data, wherein the data contains identifying information of an NFT including any of blockchain, contract, token identification, or ID, and/or ordinal; receiving one or more playbooks to enact to achieve a better individual and global score, wherein the one or more playbooks received are determined by the any of blockchain, contract, token ID, and/or ordinal; determining by lookup the available playbooks and matching against the request as well as defaults; executing the one or more playbooks on the data; generating, signing, and storing log information for public/private use; generating new endpoints to index, serve public/private data; generating an updated set of assessments based on the newly available data; transmitting the updated data back to the requester; and transmitting triggered notifications to predefined and/or requester defined endpoints.

FIG. 3 illustrates a simplified block diagram showing the computer implemented method to assess, remediate, and maintain non-fungible tokens (NFTs) of the present invention.

tion. The method comprises a non-transitory computer-readable storage medium storing executable computer program instructions, the computer program instructions comprising instructions that when executed cause a computer processor to perform the following steps: receiving data, wherein the data contains identifying information of an NFT including any of blockchain, contract, token identification, or ID, and/or ordinal, wherein the data is received from one or more requesting services (external or internal); determining previous results data, if any; obtaining any and all necessary external data from external application programming interfaces, or APIs, calls, direct review of blockchains, or access to any and all storage, wherein the external data is verified by leveraging cryptographic proofs, if and when necessary; compiling the data, previous results data, and any and all necessary external data to form compiled data; receiving the frequency by which the NFTs are monitored (per request, regular interval, or based on changes emitted from on chain events); generating, queuing, and executing assessments and remediation services, wherein assessing the compiled data is achieved by running tests on the compiled data is determined by one or more playbooks, wherein the one or more playbooks used are determined by the any of blockchain, contract, token ID, and/or ordinal, wherein an overall compiled data output is generated by leveraging default test weights to create a holistic score, wherein the overall compiled data output includes the score, wherein recommendations on how to improve individual and global results are generated based on the score and overall compiled data output; storing and indexing the overall compiled data output for public/private consumption in web3 storage; transmitting the score and overall compiled data output to remediation services, wherein the remediation services receive the one or more playbooks to enact to achieve a better individual and global score; generating, queuing, and executing the one or more playbooks on the overall compiled data output; generating, signing, and storing log information for public/private use; generating new endpoints to index, serve public/private data; generating an updated set of assessments based on the newly available compiled data output; generating and transmitting instructions when manual intervention is required; transmitting the updated compiled data output and instructions back to the requester; transmitting triggered notifications to predefined and/or requester defined endpoints; and transmitting alerts when thresholds are met (e.g., changes for the better, worse, or changes that resulted in no net difference).

The method of the present invention of assessing the attestations and assurances of NFTs compromises receiving data, wherein the data contains identifying information of an NFT including any of blockchain, contract, token ID, and/or ordinal, wherein the data is received from one or more requesting services (external or internal). The method further provides determining previous results data, if any, and obtains any and all necessary external data from external API calls, direct review of blockchains, or access to any and all storage. The external data is then verified by leveraging cryptographic proofs, if and when necessary, and the data, previous results data, and any and all necessary external data are compiled to form compiled data.

Next, the method of the present invention determines which tests to run on the compiled data. The tests are determined by one or more playbooks which are determined by the any of blockchain, contract, token ID, and/or ordinal. The tests include any of the following:

Test 1: Supported Chain—At the most fundamental layer, NFTs are smart contracts that can extend off a generalized standard (e.g., ERC-721 for Ethereum) and consist of onchain ledger entries that reference data (e.g., metadata and media) that can be onchain or offchain. If the blockchain itself goes away, the ledger entries themselves lose their validity/meaning. Typically, a contract address and tokenID represent the total address of an NFTs location. However, it is possible for an NFT to be omni-chain or bridged (e.g., moved to another chain) or exist on one of many Layer 2s ("L2s") (where state of the art systems tend to top out at Layer 3 or Layer 4). Layer-1 or L1 refers to the underlying architecture of a blockchain, and L2 refers to the overlaying network that lies on top of the L1. The assurances around the base chain can be undermined. Therefore, this test verifies the original and current chain the NFT occupies. Based on the value, the present invention ascribes a score based on which chains are more likely to persist for 10-years. This persistence is based on overall economic activity, developer activity, and the current age of the blockchain).

Test 2: Token Type/Standard—Some standards have different property rights defaults. For example, there are NFT types whereby the minter/owner of the smart contract retains full control over transferability. This may make sense for some use cases (e.g., a hotel distributing a token for room access to a guest) but would be inappropriate for an asset expected to be fully owned by a buyer. This test assures that type.

ERC721 is standard for representing ownership of NFTs, and has strong best practices around transfers, updates, and upgrades. While most people believe NFTs are a universal standard, the reality is that new forms of NFTs will continue to emerge. Knowing that an NFT uses a standard like ERC721 (which tends to default to the current owner having the main rights of transferability) provides stronger assurances around the property rights of this asset.

Similar to ERC721, ERC1155 has strong best practices around transfers, updates, and upgrades. Knowing that an NFT uses a standard like ERC1155 (which tends to default to the current owner having the main rights of transferability) provides stronger assurances around the property rights of this asset.

Test 3: TokenURI Format—In order for the data to be useful, it has to be in a common, readable format. It is possible to store encrypted or binary data that are restrictive. This test verifies the format.

Test 4: TokenURI Storage—Different storage types offer varying levels of persistence, longevity, and uptime. Also, different storage types can be man-in-the-middle attacked to remove/alter the original metadata or media. The present invention analyzes the type to determine the likelihood of this externally linked data will persist. This test verifies the storage type used, as well as testing the number of known seed backups for web3 endpoints like InterPlanetary File System ("IPFS") or Filecoin.

Test 5: Media Storage—Different storage types offer varying levels of persistence, longevity, and uptime. Also, different storage types can be man-in-the-middle attacked to remove/alter the original metadata or media. The present invention analyzes the type to determine the likelihood of this externally linked data will persist. This test verifies the storage type used while also testing the number of known seed backups for web3 endpoints like IPFS or Filecoin.

When determining whether an asset will exist in the future, even just 10 years in the future, users need assurances that the chain itself has achieved escape velocity. The fact is that many top ten chains have already fallen into obscurity. As time goes on, there are no guarantees any specific chain will come back into regular usage.

Ethereum has had steady and sustained growth of its developer and user base even after two major bear markets. And even if another L1 chain became more popular, Ethereum has enough of a following to ensure the chain will exist in some form or fashion in 2033.

For token URI and media URL Base64, NFT metadata encoded this way are stored on the blockchain itself. As long as the chain exists, the (current) metadata exists. The TokenURI typically points to a URI. However, the standard does not require nor check that the data stored here is valid. Many have exploited this to stuff in a base64 string. This means that all the metadata is stored onchain vs an offchain link. Therefore, the data will persist as long as full archives of the chain exist AND as long as the metadata isn't altered again.

For token URI and media URL IPFS, the protocol is web3 native. Missing files can be reseeded if the original exists and uploaded to a node. The IPFS protocol introduces the idea of a content identifier (CID) versus a location identifier (URI). This is beneficial because an IPFS link guarantees a unique finger print for every piece of content out there. So long as one copy exists, it will continue to be servable. However, if the last copy is deleted without any backups, it is gone for good.

For token URI and media URL Arweave, the network is still not guaranteed by its financial models. It could be abandoned in 10-20 years. Arweave represents an alternative web3 storage solution to IPFS. Instead of CIDs with multiple copies being replicated across a network of nodes, Arweave weaves fragments of each file into its distributed blockchain storage. This means that as long as the network is up, there are strong assurances that every piece of content is permanently stored and retrievable. The only risk factor is if the network itself ceases to be viable financially and all copies of the archive nodes are abandoned.

For token URI and media URL HTTP, there are at least a dozen ways this file can become inaccessible or lost. Uniform resource identifiers ("URIs") that are location based are fragile. Metadata that is location based will inevitably break as the external platforms keep updating their URL structure over time. Therefore, any HTTP based tokenURI should not be trusted to persist over a 5-10 year period.

It is rare for an NFT to include no metadata. If a tokenURI is missing, there is no metadata or media present. It is possible this is by design (e.g., if a user wanted to have a token gated access without tipping off to an outside observer what the intention of the NFT is/was). Therefore, users should be very careful about NFTs without any metadata.

Test 6: Changelog—Many NFTs are not static/immutable. Some NFTs have characteristics that allow the metadata and media to change continuously in ways that are measurable onchain (stepping through the historical history) or offchain (external URLs that can be updated by 3rd parties). Being able to accurately recreate the history backwards as well as capture all deltas moving forward impacts the assets overall provenance/history and therefore value. This test determines if changelog information is readily available by known 3rd party APIs, oracles, or is embedded/referenced/updated within the metadata itself.

Many NFTs do not have their metadata frozen. This means that it is possible to change the metadata as often as the minting contract is willing to pay the gas fees. For offchain metadata, this can be changed as frequently a webpage can be updated. To that end, without a full history of a changelog vs blockheight, a user cannot truly know if the NFT was always a particular way or if it evolved over time.

Test 7: Stolen Status—At times, there are public hacks and thefts that impact an NFT's value/ability to be sold. This test connects with known 3rd party registries and oracles to react to known/verified issues.

OpenSea is one such 3rd party registry. The OpenSea registry flags NFTs that are known to be spam or stolen. This can impact its value and legitimacy. When NFTs are stolen in obviously traceable ways, this data is submitted to Open-Sea in an attempt to block the thieves from being able to profit from the sale.

If the OpenSea registry has no knowledge of issues related to this NFT being spam or stolen, this does not necessarily mean that something has not happened. However, there is a high degree of likelihood that most expensive, high value assets that have been stolen will make their way onto the OpenSea registry.

Different registries or other methods of ensuring the status of an NFT can be utilized.

Test 8: Metadata Standards—Similar to how a web browser can only interpret/render a webpage that adheres to standards, an NFT using arbitrary markup and structure can be difficult or impossible to interpret by apps/dapps. Therefore, this test scans for typical patterns. It is a bonus if the standard itself is defined and referenced.

Test 9: Copyright/IP—This test verifies if copyright, IP, licenses, royalties, and other factors are defined and signed by the creator/owner themselves. Are these accessible directly within the metadata? Or are their signed assertions available in a public/private index?

Test 10: Smart Contract—Here the present invention tests numerous things, including: (a) whether the smart contract is verified (e.g., is the source code available); (b) automatic vulnerability assessments (e.g., can a code analyzer detect backdoors); (c) binary assessment (e.g. can a code analyzer detect backdoors); (d) AI assessment (e.g., are there any vulnerabilities or non-obvious behavior); and (e) upgrade-ability (e.g., can the contract be changed on in whole or in parts to create new attack vectors).

Having the contract source code allows for manual and automated analysis for nefarious behavior. While some attacks are hidden in plain sight within open source code-bases, hackers can better obscure their backdoors when the source code is not available. By not providing the source, audits are much harder to achieve and cannot guarantee that some edge cases are covered. Without the contract source code, it is challenging to determine if there are backdoors to steal this NFT.

Test 11: Transfer Standards—Piggybacking off Test 10, the present invention determines whether there are known rights around who can transfer an asset that is possessed. The present invention looks at whether any address that is not the owner or any address that has been delegated authority to move the asset without the owner's permission, and whether the smart contract has logic that moves that asset based off factors other than the owner's consent.

Test 12: Offchain Remediation and Attestations—The present invention looks at whether there are off chain signed messages from approved addresses that append/override metadata defined on chain, and whether this data is publicly (or privately in a gated API) available and verifiable with cryptographic signatures by the signing parties.

These tests, and the details included for each test, are not exhaustive, and other tests and factors may be included in the overall assessment.

The tests are run on the compiled data and individual results are generated by processing the compiled data with each playbook available per blockchain. An overall com-piled data output is generated by leveraging default test weights to create a holistic score. The overall compiled data output includes the score.

Recommendations on how to improve individual and global results are generated based on the score and overall compiled data output. The overall compiled data output is stored and indexed for public/private consumption in web3 storage. Finally, the score and overall compiled data output are transmitted back to requesting services.

The method of the present invention of remediating NFT deficiencies and improving overall assurances compromises receiving data. The data contains identifying information of an NFT including any of blockchain, contract, token ID, and/or ordinal. One or more playbooks, which are deter-mined by the any of blockchain, contract, token ID, and/or ordinal, are received to enact to achieve a better individual and global score. The available playbooks are determined by lookup and matched against the request as well as defaults. The playbooks are stored within the system of the present invention, or external as plugins.

The one or more playbooks are executed on the data. The log information is generated, signed, and stored for public/private use. New endpoints are generated to index, serve public/private data. An updated set of assessments is gen-erated based on the newly available data, and the updated data is transmitted data back to the requester. Triggered notifications are transmitted to predefined and/or requester defined endpoints.

The system of the present invention of assessing, reme-diating, and maintaining NFTs comprises receiving data, wherein the data contains identifying information of an NFT including any of blockchain, contract, token ID, and/or ordinal, wherein the data is received from one or more requesting services (external or internal). The method fur-ther provides determining previous results data, if any, and obtains any and all necessary external data from external API calls, direct review of blockchains, or access to any and all storage. The external data is then verified by leveraging cryptographic proofs, if and when necessary, and the data, previous results data, and any and all necessary external data are compiled to form compiled data.

The frequency by which the NFTs are monitored is received (per request, regular interval, or based on changes emitted from on chain events). Assessment and remediation services are generated, queued, and executed. The compiled data is assessed by running tests on the compiled data is determined by one or more playbooks which are determined by the any of blockchain, contract, token ID, and/or ordinal.

An overall compiled data output is generated by leverag-ing default test weights to create a holistic score. The overall compiled data output includes the score. Recommendations on how to improve individual and global results are gener-ated based on the score and overall compiled data output.

The overall compiled data output is stored and indexed for public/private consumption in web3 storage, and the score and overall compiled data output is transmitted to remedia-tion services. The remediation services receive the one or more playbooks to enact to achieve a better individual and global score. The one or more playbooks are generated, queued, and executed on the overall compiled data output.

Log information is generated, signed, and stored for public/private use, and new endpoints are generated to index, serve public/private data.

An updated set of assessments is generating a based on the newly available compiled data output. The instructions are generated and transmitted when manual intervention is required. The updated compiled data output and instructions are transmitted back to the requester. Triggered notifications are transmitted to predefined and/or requester defined end-points. Finally, alerts are transmitted when thresholds are met (e.g., changes for the better, worse, or changes that resulted in no net difference).

Numeric scores can be categorized by a level of severity based on their contribution to individual and global risk. The scores determined by the present invention typically comprise one of five categories: Score 10—Immutable; Score 7-9—High Assurance; Score 4-6—Moderate; Score 1-3— High Risk; and Score 0—Impossible.

For the Immutable rating, short of a complete failure of the underlying blockchain, there is no way to change the underlying data. For High Assurance rating, assets have done the best they can to assert/attest to long-term assurance. For Moderate rating, users should proceed with caution. There are several possible attack vectors that need to be addressed. For High Risk rating, the assets in question are highly vulnerable and need significant remediation. Finally, Impossible rating indicates a less than 0.1% chance of fixing unless something akin to an unknown backup is later discovered and made available.

An NFT's property rights assertions can be violated in a number of ways. A common attack in NFTs is the process of sleep minting. Here an asset can be controlled by a non-owner wallet to transfer through a verified, public wallet to fake its provenance. By being able to identify assets with a smart contract containing this vulnerability, buyers, owners, and users of this token can either avoid the asset altogether, fix the deficiency, or use it knowing full well this risk will be exploited.

This represents one of many attack vectors upon the fundamental assertions. They are: (1) Authenticity: Is this the original? Forgery? Spam? Copy?; (2) Longevity: Will this last for at least a decade?; (3) History/Provenance: What is the full custody of ownership along with external data?; (4) Legal Rights: Copyright, IIP, royalties, and usage rights; (5) Grading: Digital Twins for IRL/RWA assets; (6) Rarity: Are there guarantees around quantity and copies? Important for ERC1155; (7) Smart Contract Upgrade Risk: How sure are the overall guarantees above? Attack vectors/risk?; (8) Interoperability/Compatibility: How well does this asset conform to open standards?; (9) Playback: How likely can/will this asset perform in the future?; (10) Extendibility: Are there mechanisms in place to build on top or not?; (11) Documentation: For assets with complex logic and interactivity, is this well understood and communicated both to humans and machines?; (12) Entity Relationships: Direct/indirect relationships connection to other NFTs?; and (13) Expiration: Similar to ENS, does owning this asset require subscription/maintenance fees? Given NFTs are a new primitive that are still experiencing a Cambrian explosion of innovation (similar to how web pages were simple text and now are fully robust platforms), these dimensions are expected to expand over time.

In the above example of sleep minting, it is possible to apply the methodologies described in the present invention to an NFT in as follows for a given NFT contract and token ID: (1) Verify a verified smart contract exists in the public or private domain; (2) Scan this NFT with known security detection software; (3) Apply AI to determine if there are any patterns by which additional, non-obvious transfer rights are hidden or obscured; and (4) Download the smart contract to a sandboxed testnet to apply pentest style procedures to verify if a non-owner transfer is possible.

If any of the proceeding steps fail, deductions from a perfect score are applied alongside a confidence score (to indicate that there may be additional unknowns that were not tested for). In situations where a smart contract had a known backdoor and place but was still upgradeable, remediation to plug this attack vector (both at present and permanently) could be provided.

For situations involving a high risk rating on media storage (e.g., a situation where there are fewer than 2 known seeds backing up an asset), remediation is employed in a few ways to increase over a threshold tolerance required by contract: (1) Paid IPFS pinning services could be deployed with a given number of seeds per service; (2) Free, public IPFS pinning services can be leveraged; and/or (3) For small files, full copies of this can be moved onchain with its content identifier (CID) exposed for future seeding needs.

Playbooks as that term is used herein can be updated based on: (1) an update to existing blockchain functionality; (2) the creation of new state of the art alternatives; (3) a material change in the architecture of a solution (e.g., Arweave gets acquired); or (4) the introduction of new chains, new smart contract types, etc.

The methods and systems of the present invention may comprise any number of the steps contained herein, in any combination. Additional steps may be added or removed to achieve the desired results.

The best mode for carrying out the invention has been described herein. The previous embodiments are described in sufficient detail to enable those skilled in the art to make and use the invention. It is to be understood that other embodiments would be evident based on the present disclosure, and that system, process, or mechanical changes may be made without departing from the scope of the present invention.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying figures are to be interpreted in an illustrative and non-limiting sense.

What is claimed is:

1. A computer implemented method of assessing the attestations and assurances of non-fungible tokens, or NFTs, comprising:

receiving a request to assess attestations and assurances of an NFT containing data from a requester, wherein the data contains identifying information of an NFT including any of blockchain, contract, token identification, or ID, and/or ordinal;

determining previous results data, if any;

obtaining necessary external data from external application programming interface, or API, calls, direct review of blockchains, or access to storage locations, wherein the external data is verified by leveraging cryptographic proofs, if and when necessary;

compiling the data, previous results data, and necessary external data to form compiled data;

determining which tests to run on the compiled data, wherein the tests are determined by one or more playbooks, wherein the one or more playbooks used are determined by the any of blockchain, contract, token ID, and/or ordinal;

running the tests on the compiled data, wherein individual results are generated by processing the compiled data with each playbook available per blockchain, wherein an overall compiled data output is generated by leveraging default test weights to create a holistic score, wherein the overall compiled data output includes the score, wherein recommendations on how to improve individual and global results are generated based on the score and overall compiled data output;

storing and indexing the overall compiled data output for public/private consumption in web3 storage; and transmitting the score and overall compiled data output back to requesting services.

2. The computer implemented method of claim 1, wherein the request to perform the method of assessing the attestations and assurances of non-fungible tokens, or NFTs, occurs at the time of NFT interaction with the requester's wallet or dapp/smart contract to provide warnings and other safeguards.

3. The computer implemented method of claim 1, wherein the request to assess the attestations and assurances of NFTs occurs from 3rd party app/dapps needing real-time verifications to assert the claims on an asset.

4. The computer implemented method of claim 1, wherein the the overall compiled data output is used by oracle services.

5. The computer implemented method of claim 1, wherein the requester submits their own weighting mechanisms.

6. The computer implemented method of claim 1, wherein the requester submits their own logic or playbooks.

7. The computer implemented method of claim 1, wherein external verification badges can be generated and displayed on 3rd party locations and show current results along with links to see list of evidence with historical records.

8. The computer implemented method of claim 1, wherein signed attestations and evidence with cryptographic signatures or proofs is provided as assertions.

9. A computer implemented method of remediation of deficiencies of non-fungible token, or NFT, and improving overall assurances, comprising:

receiving a request to remediate the deficiencies of an NFT containing data from a requester, wherein the data contains identifying information of an NFT including any of blockchain, contract, token identification, or ID, and/or ordinal;

receiving one or more playbooks to enact to achieve a better individual and global score, wherein the one or more playbooks received are determined by the any of blockchain, contract, token ID, and/or ordinal;

determining by lookup the available playbooks and matching against data from the requester as well as defaults;

executing the one or more playbooks on the data;

generating, signing, and storing log information for public/private use;

generating new endpoints to index, serve public/private data;

generating an updated set of assessments based on the newly available data;

transmitting the updated set of assessments back to the requester; and transmitting triggered notifications to predefined and/or requester defined endpoints.

10. The computer implemented method of claim 9, wherein the method of remediation of NFTs occurs at the time of NFT interaction, transmission, purchase, or sale.

11. The computer implemented method of claim 9, wherein off chain remediation information is served from a known, verified index and leverageable by apps/dapps.

12. The computer implemented method of claim 9, wherein the requester provides their own keys, credentials, and access points for remediation storage and other factors vs reliance on default facilities.

13. The computer implemented method of claim 9, wherein bulk actions are taken over entire collections or a plurality of collections.

14. The computer implemented method of claim 9, wherein a minimum achievable score is desired over a perspective set of tasks to run.

15. The computer implemented method of claim 14, wherein a determination is made based on the target goal and the ease by which the system can implement.

16. The computer implemented method of claim 9, wherein changes require manual intervention on behalf of the requester to authorize, sign, or otherwise interact with or without the method to achieve the desired remediation.

17. The computer implemented method of claim 9, wherein the requester can submit custom data and playbooks.

18. The computer implemented method of claim 9, wherein cryptographic evidence is provided along with signed attestations and assurances.

19. The computer implemented method of claim 9, wherein oracles are notified.

20. A computer system to assess, remediate, and maintain non-fungible tokens, or NFTs, comprising:

a non-transitory computer-readable storage medium storing executable computer program instructions, the computer program instructions comprising instructions that when executed cause a computer processor to perform steps comprising:

receiving a request to assess, remediate, and maintain attestations and assurances of an NFT containing data from a requester, wherein the data contains identifying information of an NFT including any of blockchain, contract, token identification, or ID, and/or ordinal determining previous results data, if any;

obtaining necessary external data from external application programming interfaces, or APIs, calls, direct review of blockchains, or access to storage, wherein the external data is verified by leveraging cryptographic proofs, if and when necessary;

compiling the data, previous results data, and necessary external data to form compiled data;

receiving the frequency by which the NFTs are monitored per request, regular interval, or based on changes emitted from on chain events;

generating, queuing, and executing assessments and remediation services, wherein assessing the compiled data is achieved by running tests on the compiled data is determined by one or more playbooks, wherein the one or more playbooks used are determined by the any of blockchain, contract, token ID, and/or ordinal, wherein an overall compiled data output is generated by leveraging default test weights to create a holistic score, wherein the overall compiled data output includes the score, wherein recommendations on how to improve individual and global results are generated based on the score and overall compiled data output;

storing and indexing the overall compiled data output for public/private consumption in web3 storage;

transmitting the score and overall compiled data output to remediation services, wherein the remediation services receive the one or more playbooks to enact to achieve a better individual and global score;

generating, queuing, and executing the one or more playbooks on the overall compiled data output;

generating, signing, and storing log information for public/private use;

generating new endpoints to index, serve public/private data;

generating an updated set of assessments based on the newly available compiled data output;

generating and transmitting instructions when manual intervention is required;

transmitting the updated compiled data output and instructions back to the requester;

transmitting triggered notifications to predefined and/or requester defined endpoints; and transmitting alerts when thresholds are met.

21. The computer system of claim 20, wherein a decrease or alteration in an individual or global score triggers an automatic operation when possible to remediate and maintain a given score.

22. The computer system of claim 20, wherein a dip in an individual or global score triggers an alert to predefined parties and systems to enact necessary, manual interventions.

23. The computer system of claim 20, wherein a reduction in score is permanent and unfixable, and any necessary changes as a result of that change is employed.

24. The computer system of claim 20, wherein certified attestations of the score before and after a given blockheight or UTC timestamp or created and attested to with cryptographic signatures and stored in a public/private registry.

25. The computer system of claim 20, wherein a duration of monitoring and maintenance of a score is set.

26. The computer system of claim 20, wherein a loss of all known media and metadata seeds is initiated by retrieval and deployment from offline or archival storage.

27. The computer system of claim 20, wherein the requesters can access entire previous snapshots of an NFT's data and media.

* * * * *